United States Patent [19]
Ross

[11] 4,059,419
[45] Nov. 22, 1977

[54] VORTEX NUCLEATION SCRUBBING METHOD AND APPARATUS

[76] Inventor: Leon Irving Ross, P.O. Box 514, Grand Cayman, British W. Indies

[21] Appl. No.: 595,004

[22] Filed: July 11, 1975

Related U.S. Application Data

[63] Continuation-in-part of Ser. No. 398,587, Sept. 18, 1973, abandoned.

[30] Foreign Application Priority Data

| | | |
|---|---|---|
| Oct. 2, 1972 | United Kingdom | 45266/72 |
| Mar. 5, 1974 | Canada | 181061 |

[51] Int. Cl.$^2$ ............ B01D 47/00

[52] U.S. Cl. ............ 55/92; 55/122; 55/237; 55/259; 55/263; 55/399; 55/406; 261/79 A

[58] Field of Search ............ 55/92, 122, 235–239, 55/263, 259, 406, 337, 399; 261/79 A

[56] References Cited

U.S. PATENT DOCUMENTS

| | | | |
|---|---|---|---|
| 710,605 | 10/1902 | Osborne et al. | 55/235 |
| 2,509,817 | 5/1950 | Foreman | 55/235 |
| 2,840,454 | 6/1958 | Tomlinson et al. | 261/79 A |
| 3,399,770 | 9/1968 | Solomon | 209/211 |
| 3,409,409 | 11/1968 | Sackett, Sr. | 55/259 |
| 3,505,788 | 4/1970 | Teller et al. | 55/235 |
| 3,678,659 | 7/1972 | Schouw | 55/238 |
| 3,744,221 | 7/1973 | Ross | 55/263 |

FOREIGN PATENT DOCUMENTS

| | | | |
|---|---|---|---|
| 1,295,829 | 5/1962 | France | 55/237 |

*Primary Examiner*—Bernard Nozick
*Attorney, Agent, or Firm*—William R. Liberman

[57] ABSTRACT

Particulate matter is separated from an aerosol by a process in which the aerosol is spun fast enough to create a vortex therein. The temperature in the relatively colder inner zone near the axis of spin of the vortex is made to fall low enough to cause at least part of the particulate matter to be wet therein by the condensation thereupon of vapor. This vapor is introduced or evaporated into a relatively warmer outer zone of the vortex farther away from the axis of spin.

13 Claims, 4 Drawing Figures

VORTEX NUCLEATION SCRUBBING METHOD AND APPARATUS

RELATED APPLICATION

This application is a continuation in part of my copending application Ser. No. 398,587 filed 18 Sept. 1973 under the title "Centrifugal Nucleation Scrubbing" now abandoned.

FIELD OF THE INVENTION

This invention relates to a process and apparatus for the continuous separation of particulate matter from a suspension thereof in a gaseous medium.

BACKGROUND OF THE INVENTION

It has been known that particles heavy enough to be displaced in such a suspension by gravitational or centrifugal means can be so separated therefrom by well known apparatus, such as settling chambers or dry cyclones. It is also known that somewhat smaller particles can be made heavy enough by wetting, making it possible to separate them in other known apparatus, such as wet cyclones or scrubbers.

However, many constituents of particulate aerosols (for purposes of this application aerosols may be defined as suspensions, in a gaseous medium, comprising particulate matter not heavy enough to be separable by gravitational or centrifugal means) are so small that they are hard to wet either by sprays directed toward them or by bodies of liquid through which the aerosols are bubbled or against which they are impinged. The relatively large surface area exposed by sub-micron particles surrounds them with gaseous envelopes which tend to prevent direct contact between the wetting liquid and the unwet particles. They can however be wet by supersaturating the gaseous medium with the vapor of a liquid which is thus condensed directly from the vapor phase upon the surfaces of the suspended particles. This happens naturally when clouds are formed upon nuclei suspended in rising air currents.

Scrubbers designed in the past to make use of this principle have been handicapped by their tendency to wet only the largest of the particles present because the vapor pressure of a mist droplet at a particular temperature varies inversely with its diameter. Therefore, when the aerosol becomes supersaturated, the first droplet formed by condensation upon the surface of the largest particle will grow cumulatively larger as its increasing size reduces its vapor pressure farther below the particle pressure of the uncondensed vapor. Thus the vapor tends to condense preferentially upon a growing droplet of liquid rather than upon adjacent smaller dry particles.

For the same reason, when a vapor-bearing aerosol is cooled through contact either with a colder surface or a spray of colder liquid, not only will condensation occur preferentially upon the coolant, but existing smaller mist droplets will tend to dry out through vapor transfer to the larger colder surfaces and the smallest dry particles will escape with the scrubbed gas output. Therefore, scrubbers designed to wet particulate aerosols by the injection of steam have been faced either with the loss of significant quantities of heat and water vapor or the escape of the smaller particles.

OBJECTS AND SUMMARY OF THE INVENTION

An object of the present invention is to separate dry particles from a particulate aerosol by condensing liquid upon them to convert them into mist droplets which are caused to coalesce with one another to form drops heavy enough to fall from suspension. Such coalescence is accomplished first through collisions induced by spinning the aerosol while the droplets are being formed and later by passing the resultant cloud of mist droplets through a mist collector or electrostatic/precipitator.

Another object of this invention is to provide means for wetting even the smallest particles in a particulate aerosol by spinning it fast enough to create a vortex in which the temperature near the axis of spin falls low enough to condense liquid, from vapor introduced farther from the axis of spin, upon the largest of the particles present until they grow heavy enough to be displaced far enough centrifugally to permit condensation to commence upon smaller and smaller particles closer to the axis of spin.

A further object of the invention is to provide means for the countercurrent cooling of a cloud of mist droplets, such as those formed by the condensation of liquid upon particulate aerosols, without causing them to dry out by vapor transfer to the coolant. This is accomplished by spinning the aerosol fast enough to create a vortex with a radial temperature gradient steep enough to prevent vapor transfer from the smaller mist droplets nearer the axis of spin to a liquid coolant or other surface farther from the axis of spin. Because of the steepness of the temperature gradient, the temperature of the aerosol in contact with the liquid coolant is high enough to cause vapor transfer from the surface of the liquid coolant to the mist droplets instead.

These objects, together with others which will become apparent, are all achieved in this invention by spinning a particulate aerosol fast enough around the longitudinal axis of a conduit, through which it is caused to flow generally countercurrently to a colder liquid spinning in the same direction in contact with the inside of the wall of said conduit, to create a vortex with a radial temperature gradient steep enough for part of said liquid to evaporate into the warmer, slower-spinning portion of the aerosol in contact therewith and to recondense upon the colder, faster-spinning particles nearer to the axis of spin.

The spinning motion can be initiated or augmented by a rotating impeller or other mechanical means or by introducing the aerosol and/or the vapor of said liquid (either in its vapor or liquid phase) through the outer wall of the conduit via one or more tangentially directed inlets.

In either case, the spinning motion creates a vortex in the aerosol with a maximum pressure and temperature in contact with the liquid at the wall of the conduit and a minimum near its longitudinal axis. Therefore, the gaseous phase of the aerosol which becomes saturated with vapor introduced or evaporated into it near the wall of the conduit will become progressively more super-saturated as it approaches the axis of spin until condensation is initiated upon the surface of a suspended particle capable of serving as a primary condensation nucleus. Condensation will continue upon that particle until it grows heavy enough to be displaced centrifugally by the spinning motion into a zone of higher pressure and temperature, thus permitting a smaller and colder particle to become a condensation nucleus in an orbit closer to the axis of spin.

This procedure can continue indefinitely as the size of the largest unwet particle becomes progressively smaller and smaller. Ultimately no particle is too small to be wet and consequently to be separated from the entraining gas stream.

After the spinning aerosol has been cooled by countercurrent contact of its outer portion with the colder liquid, it can be cooled further to provide additional condensation by being caused to flow through a convergent portion of the conduit. It can then be passed through a mist collector, preferably in the form of a mesh of fine filaments, to recover residual mist droplets by coalescence before reaching the outlet of the conduit.

DETAILED DESCRIPTION OF THE DRAWINGS

Figure 1:
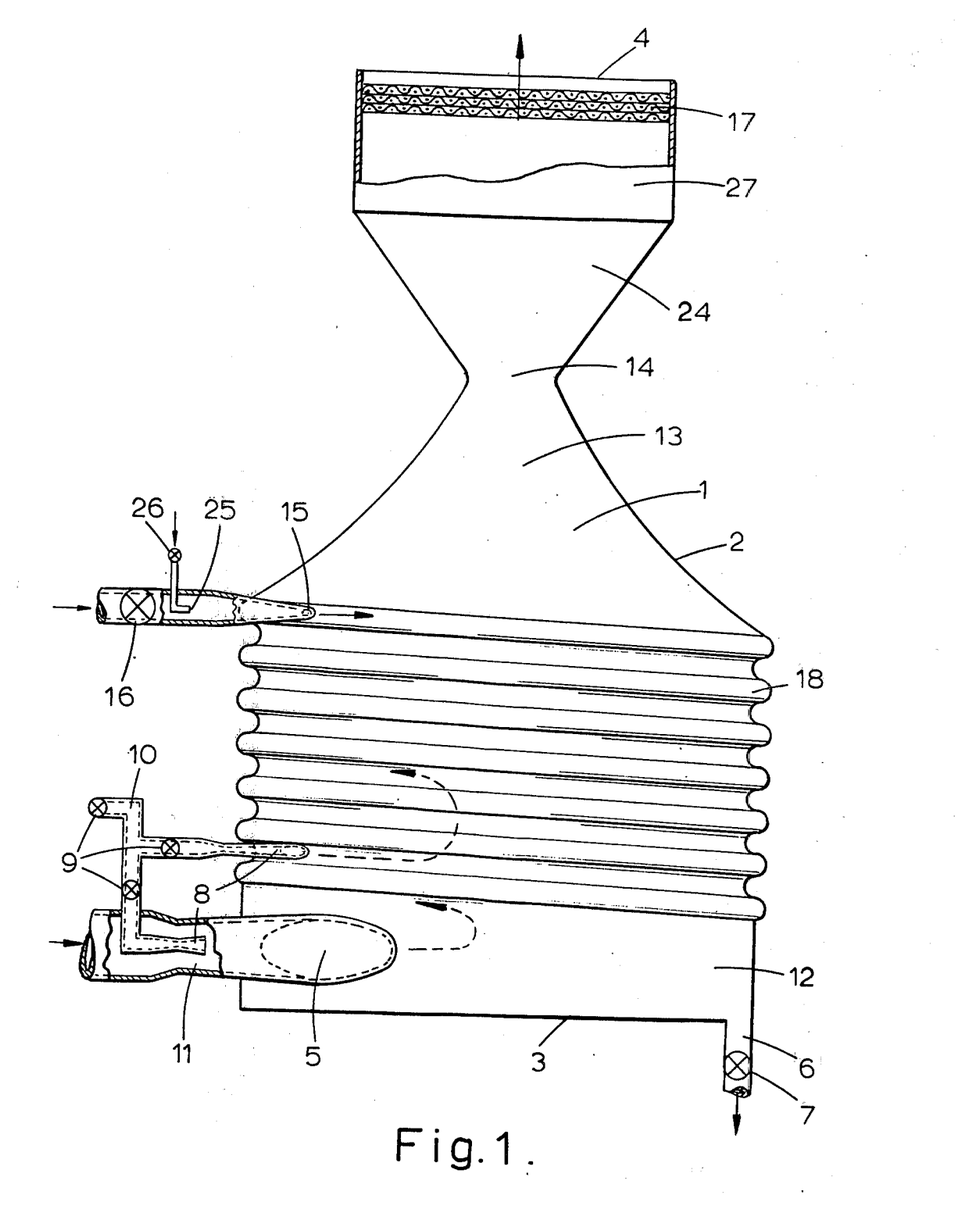
FIGS. 1 to 4 each show in partly schematic form, vertical elevations partly cut away of four embodiments of apparatus according to the invention.

Referring to FIG. 1, the apparatus comprises a generally vertical conduit 1, enclosed by a wall 2, generally symmetrical about its vertical axis.

The upper end of the conduit 1 is open to provide a scrubbed aerosol outlet 4, while its lower end is closed by the bottom 3, except for a scrubbing liquid outlet 6, penetrating the bottom 3 and leading therefrom through a liquid discharge valve 7.

The diameter of the conduit 1 is greatest in the lower cylindrical section or mouth 12, which extends upward from the bottom 3 to the convergent nozzle 13, where the diameter gradually narrows to a minimum at the throat 14 and widens again through the divergent nozzle or diffuser 24 to the upper cylindrical section 27, whose diameter is less than that of the mouth 12.

The aerosol inlet 5 is mounted tangentially to the wall 2 and directed therethrough into the mouth 12 of the conduit 1.

Also mounted tangentially to the wall 2 and directed therethrough into the mouth 12 in the same direction as the aerosol inlet 5 are a number of vapor inlets in the form of the nozzles 8, which are fed from the vapor manifold 10 through the vapor inlet valves 9.

Preferably, the lowest of the vapor inlets 8 is mounted within the aerosol inlet 5 in the form of an ejector 11, which enables the momentum of the incoming vapor to accelerate the flow of the aerosol into the conduit 1.

Preferably, the wall 2 is helically corrugated in the upper part of the mouth 12 to provide a helical channel 18, into which a scrubbing liquid inlet in the form of a convergent nozzle or orifice 15 leads from a scrubbing liquid inlet valve 16. Said scrubbing liquid inlet 15 is preferably mounted tangentially to the wall 2 and directed therethrough into the helical channel 18 in the same direction as the aerosol inlet 5 and the vapor inlets 8. Preferably, a reagent inlet 25 leads into the scrubbing liquid inlet 15 from the reagent inlet valve 26.

A mist collector 17, which comprises a mesh of fine filaments, is installed in the upper cylindrical section 27 of the conduit 1 below the scrubbed aerosol outlet 4.

In operation, the aerosol to be scrubbed is admitted continuously into the mouth 12 of the conduit 1 through the aerosol inlet 5, while the vapor of the scrubbing liquid continuously enters the mouth 12 from the vapor manifold 10 through the vapor inlets 8 at a rate controlled by the vapor inlet valves 9. The configuration of the ejector 11 in the aerosol inlet 5 enables the flow of vapor through the lowest of the vapor inlets 8 to draw the incoming aerosol with it through the aerosol inlet 5 into the mouth 12 of the conduit 1.

Because of the tangential arrangement of the aerosol inlet 5 and the vapor inlets 8, the flow of the aerosol and vapor therethrough spins the contents of the conduit 1 around the vertical axis thereof to create a vortex in the vapor-containing aerosol as it rises therein toward the scrubbed aerosol outlet 4.

Since the velocity of spin in said vortex increases from a minimum near the wall 2 to a maximum near the axis of spin, the vapor-containing aerosol at any particular level of the conduit 1 will expand generally adiabatically from a maximum pressure and temperature near the wall 2 to a minimum near the vertical axis. If said maximum temperature is low enough and said minimum velocity of spin fast enough at the wall 2, at some intermediate radius the temperature of the vapor-containing aerosol will fall below its dew point and condensation will commence upon the surface of the largest of the particles suspended in this initial zone of supersaturation.

The vapor will continue to condense upon the previously wet surface of this largest particle there until said particle grows heavy enough to be spun centrifugally outward into an orbit of higher pressure and temperature and lower velocity of spin. Meanwhile condensation will commence upon the surface of a smaller particle spinning in an inner orbit of lower pressure and temperature and continue upon smaller and smaller particles as the supersaturated aerosol is cooled further by expanding generally adiabatically toward the vertical axis. Consequently the particulate matter thus wet by condensation in the spinning vortex becomes transformed into a cloud of mist droplets with the smallest coldest droplets spinning the fastest near the axis of spin.

Although the aerosol in the conduit 1 can be both spun and supersaturated by vapor introduced thereinto through a single vapor inlet 8, a plurality of successive vapor inlets 8 will enable the spin of the vortex to be maintained or augmented along a greater length in the conduit 1. Vapor introduced thereinto through each successive vapor inlet 8 into a zone of the aerosol not yet supersaturated with said vapor (between the outer edge of the spinning cloud of mist droplets and the wall 2) will not only accelerate the spin of the vortex but will also supersaturate a portion of said zone adjacent to said cloud of mist droplets and initiate further condensation, both upon the existing mist droplets and upon smaller previously unwet particulate matter closer to the axis of spin.

Meanwhile, fresh scrubbing liquid, at a temperature below that of the outer edge of the vapor-bearing aerosol spinning upward through the conduit 1, is continuously fed in the liquid phase into the helical channel 18 through the scrubbing liquid inlet 15 at a rate controlled by the scrubbing liquid inlet valve 16.

The helical configuration of the channel 18 causes this fresh colder liquid to spin helically downward in contact with the inside of the wall 2, where it countercurrently cools the warmer outer edge of the rising aerosol with which it comes into contact there. The scrubbed aerosol can thus be cooled to whatever temperature is required by chilling the fresh scrubbing liquid before it is so introduced.

Cooling the warmer, slower-spinning portion of the aerosol at the outer edge of the vortex causes the faster-spinning portion closer to the axis of spin to be cooled to an even lower temperature, at which it becomes relatively more supersaturated so that a greater proportion of its vapor content will be condensed, first upon the existing mist droplets and ultimately upon previously unwet smaller particles as the growing droplets are spun centrifugally outward from their former orbits.

As a result of such additional condensation upon the growing mist droplets, as well as of their coalescence as they collide with one another, the diameter of the rising cloud of spinning mist droplets continues to grow until it approaches that of the conduit 1. The largest droplets in the spinning cloud will then impinge against the wall 2 where they, together with the particulate matter wet or dissolved by said droplets, will become part of the stream of scrubbing liquid spinning helically downward in the channel 18 until both the spent scrubbing liquid and the former constituents of the aerosol entrained or extracted thereby are discharged from the apparatus through the scrubbing liquid outlet 6, at a rate controlled by the liquid discharge valve 7.

When the scrubbing liquid spinning helically downward in the channel 18 has fallen to a level in the conduit 1 where the gaseous phase at the wall 2 is no longer saturated with its vapor, said vapor will evaporate from the descending scrubbing liquid to become available for subsequent recondensation upon particulate matter spinning in orbits closer to the vertical axis. Thus, so long as sufficient energy is supplied to maintain the required velocity of spin in the vortex, each molecule of scrubbing liquid can be recycled indefinitely between its vapor and liquid phases. Hence, if the vortex can be made to spin fast enough by other means, the introduction of vapor in the vapor phase through the vapor inlets 8 can be eliminated entirely, as illustrated in the other example of apparatus shown in FIG. 2.

Countercurrently cooling the rising aerosol by the relatively colder scrubbing liquid not only serves to control the final temperature and vapor content of the scrubbed aerosol output but can also assist in the extraction of soluble gases or other constituents therefrom. For this purpose it is often desirable to add to the fresh scrubbing liquid, through the reagent inlet 25 at a rate controlled by the reagent inlet valve 26, one or more surfactants or reagents capable of wetting, neutralizing or otherwise reacting with specific solid, liquid or gaseous constituents of the spinning aerosol.

The choice of scrubbing liquid depends largely upon the nature of the aerosol to be scrubbed. Where its gaseous phase is air or the products of the combustion of a fuel with air, the scrubbing liquid would normally be water or an aqueous liquid while its vapor would preferably be introduced through the vapor inlet 8 as dry steam. It could be the recycled spent scrubbing liquid withdrawn through the liquid discharge valve 7 of this apparatus or another one in series therewith and cooled, filtered, neutralized or otherwise treated to permit its re-use.

After the spinning aerosol in the mouth 12 of the conduit 1 has been countercurrently cooled and scrubbed by the liquid introduced through the scrubbing liquid inlet 15, it is further cooled and scrubbed as a result of its generally adiabatic expansion during its rise through the convergent nozzle 13. This expansion is caused to a slight extent by its increasing altitude and more significantly by the upward acceleration resulting from its increasingly constricted flow through the convergent nozzle 13.

Such further cooling will progressively super-saturate the rising aerosol to bring about more and more condensation both upon the spinning mist droplets and upon smaller previously unwet particles. Therefore more mist droplets will grow large enough to be impinged against the convergent wall 2, in contact with which they will be carried outward and downward until they join the fresh scrubbing liquid in the channel 18.

Such additional cooling and condensation will continue until the spinning aerosol reaches its minimum temperature and vapor content in the throat 14, above which its upward velocity will be reduced in the diffuser 24 until it reaches the optimum velocity for the coalescence of residual mist droplets in the mist collector 17. After passing through the mist collector 17, where the residual mist droplets are removed by coalescence with one another, the scrubbed aerosol is finally discharged from the apparatus through the scrubbed aerosol outlet 4.

Since the mist droplets acquire electrostatic charges as they rise through the conduit 1 (analogous to those developed naturally in thunder clouds and waterfalls) it is preferable for at least part of the mist collector mesh to be electrically conductive and electrically connected to the ground. Where higher potentials are required, an electrostatic precipitator can be substituted for the mesh in the mist collector 17.

Figure 2:
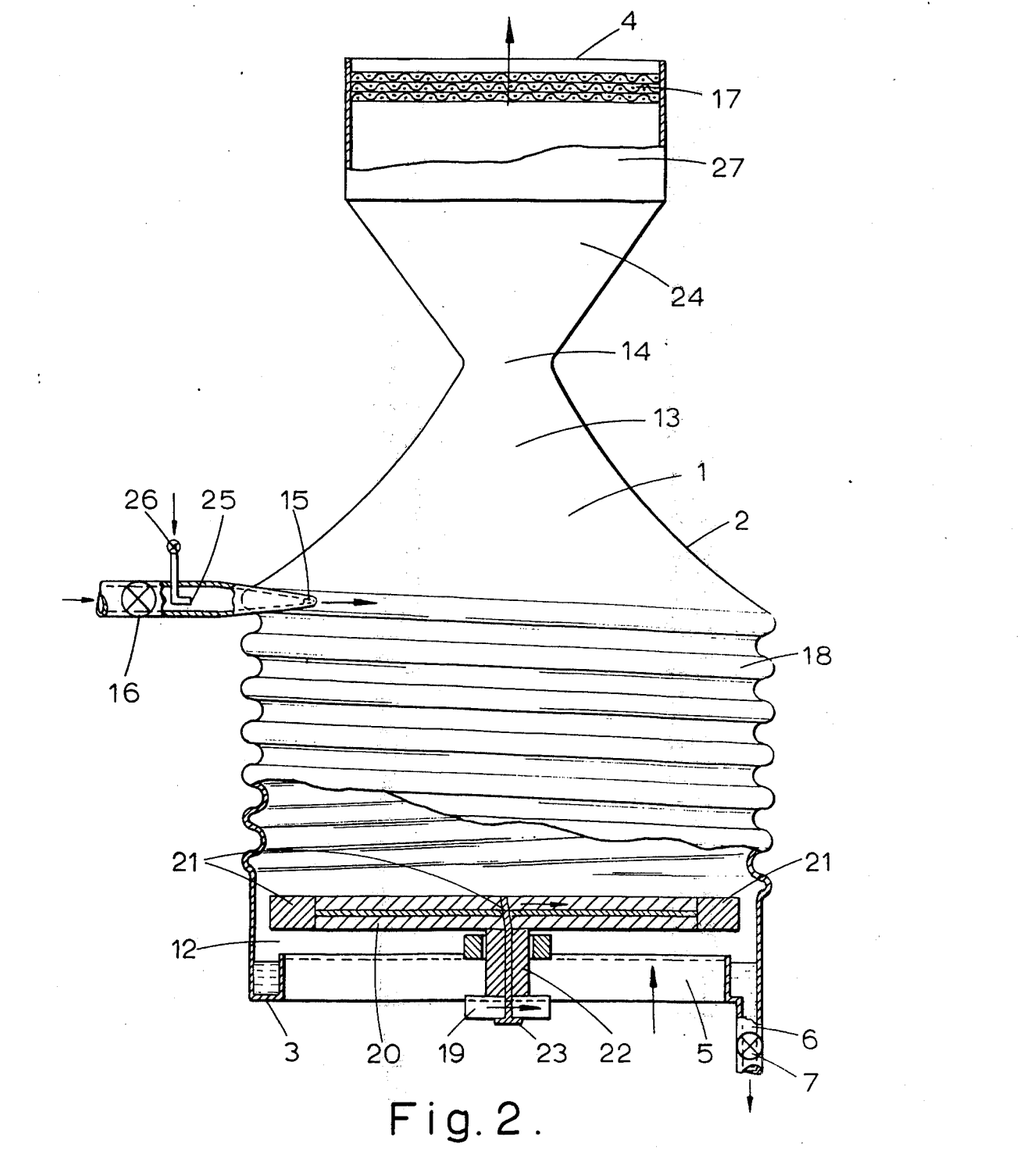

After leaving the apparatus, the scrubbed aerosol can be passed through one or more additional scrubbers according to the invention to reduce further the number of particles remaining in suspension. As each pass through the apparatus removes the largest of the suspended particles, the number and size of those remaining can be reduced to whatever degree is required by using such apparatus in series. This can also be done in an individual apparatus by regulating the proportion of the incoming vapor that passes through the ejector 11 in order to control the ratio of axial to rotational velocity in the vortex.

Where it is preferable not to boil the scrubbing liquid (such as when the aerosol is to be cooled to a temperature below ambient) the apparatus can be modified, as illustrated in FIG. 2, to avoid the introduction of the vapor of the scrubbing liquid in the vapor phase.

FIG. 2 is practically identical with FIG. 1 except for the omission of the tangential vapor and aerosol inlets and the installation instead of the impeller 19 to spin the aerosol, which is introduced into the conduit 1 through a new aerosol inlet 5, provided by opening the center of the bottom 3 below the impeller 19.

The impeller 19 comprises two or more vanes 21 mounted on a horizontal disc 20 and extending generally radially beyond the periphery thereof toward the wall 2. The center of the disc 20 is connected to a vertical drive shaft 22 by which the impeller 19 can be spun around the vertical axis of the conduit 1, in the mouth 12 of which it is installed. The vanes 21 are inclined enough from the vertical for the rotation of the shaft 22 to draw the aerosol upward through the conduit 1 from the aerosol inlet 5 at the bottom to the scrubbed aerosol outlet 4 at the top at the rate appropriate for the required velocity of spin. Such inclination of the vanes 21 can be adjusted by the variable pitch mechanism 23 to regulate the ratio of axial to rotational velocity of the spinning aerosol.

In operation the principal difference between the apparatus illustrated in FIG. 2 and that shown in FIG. 1 is the spinning of the aerosol by the impeller 19 rather than by tangential entry of both the vapor and the aerosol.

The aerosol, continuously drawn through the aerosol inlet 5 and spun by the impeller 19 around the vertical axis of the conduit 1, rises helically therethrough at a speed controlled by the variable pitch mechanism 23. Meanwhile, the scrubbing liquid, at a temperature low enough to reduce that of the scrubbed aerosol output to the exit temperature desired, is continuously introduced into the helical channel 18 through the tangentially directed scrubbing liquid inlet 15 at a rate regulated by the scrubbing liquid inlet valve 16. Any surfactants or reagents required are fed into the fresh scrubbing liquid through the reagent inlet 25 at a rate controlled by the reagent inlet valve 26.

The scrubbing liquid so introduced spins helically downward in the channel 18 in contact with the wall 2 toward the scrubbing liquid outlet 6. The generally countercurrent contact between the descending liquid and the rising aerosol causes the relatively warmer outer zone of the spinning aerosol to be cooled, scrubbed and saturated with the vapor of the scrubbing liquid. The subsequent adiabatic expansion in the vortex of the vapor so evaporated from the descending liquid causes it to recondense upon the particulate matter suspended in the colder portion of the spinning aerosol closer to the axis of spin until the particulate matter so wet becomes heavy enough to be displaced centrifugally by the spin of the vortex and impinged against the wall 2 in the manner previously described. The spent scrubbing liquid, together with the particulate matter wet or dissolved thereby, is continuously withdrawn through the scrubbing liquid outlet 6 at a rate controlled by the liquid discharge valve 7 while the residual mist droplets are removed from the rising aerosol by the mist collector 17 before the scrubbed and cooled aerosol output is finally exhausted through the scrubbed aerosol outlet 4.

If desired, the temperature of the scrubbed aerosol output can be reduced below that at which the scrubbing liquid is introduced by maintaining the contents of the conduit 1 at a pressure high enough to permit the subsequent expansion of the scrubbed aerosol output to cool it to whatever final temperature is required. Increasing the pressure of the contents of the apparatus will also contribute a significant increase to its capacity.

Figure 3:
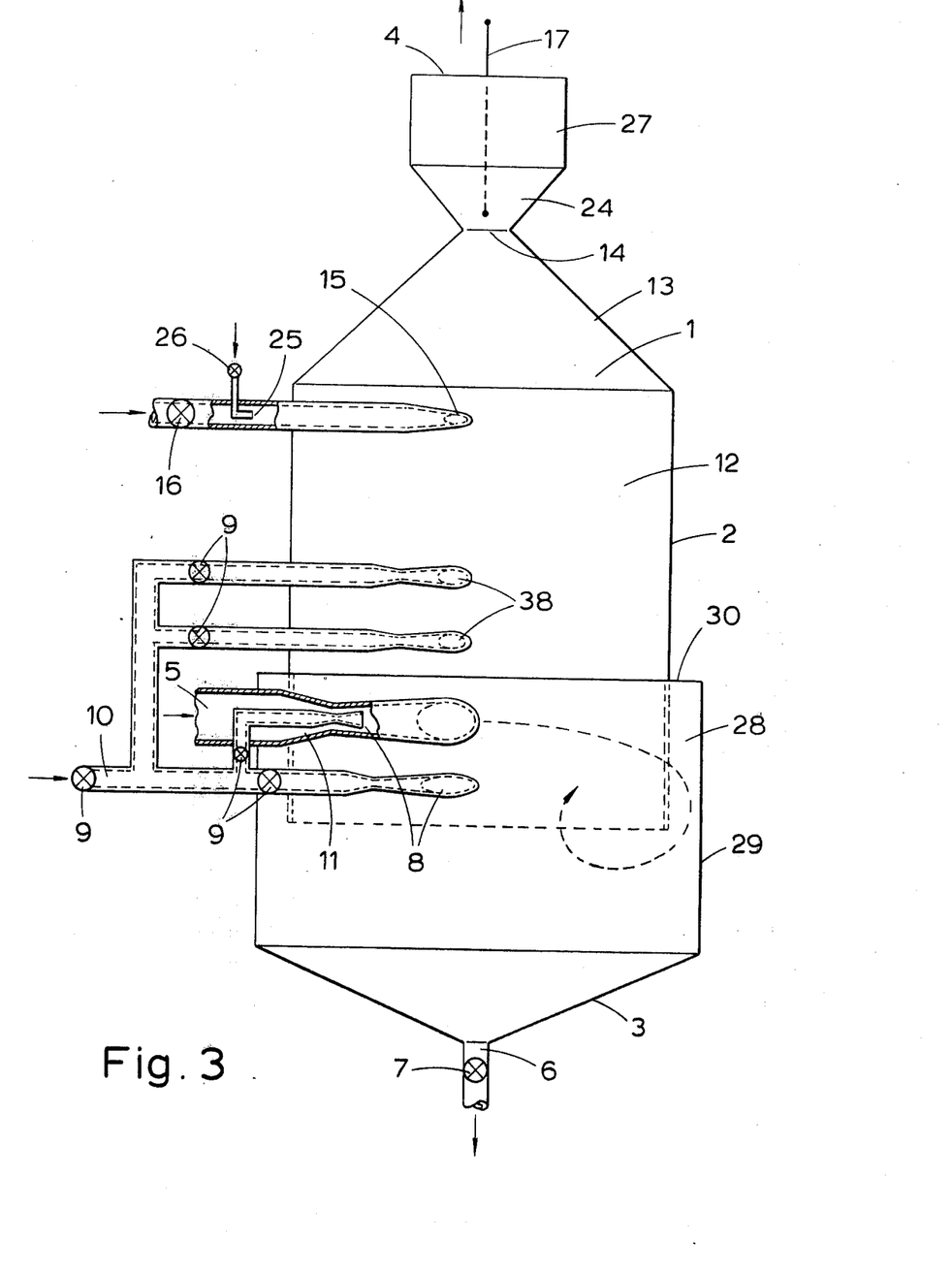

The embodiment shown in FIG. 3 comprises two generally vertical coaxial hollow members 1 and 28. The outer member or downtake 28 has a top 30, a cylindrical wall 29 and a conical base 3. The inner member or uptake 1 is open at both ends extending upward from the downtake 28 at the bottom to the scrubbed aerosol outlet 4 at the top.

Near the upper end of the outer member or downtake 28, an aerosol inlet 5 is mounted tangentially to the wall 29 and directed therethrough into the downtake 28. The scrubbing liquid outlet 6 leads from the base 3 of the downtake 28 through the scrubbing liquid discharge valve 7.

Also mounted tangentially to the wall 29 and directed therethrough into the downtake 28 in the same direction as the aerosol inlet 5 are a number of vapor inlets in the form of the nozzles 8, which are fed from the vapor manifold 10 through the vapor inlet valves 9.

Preferably the highest of these vapor inlets 8 is mounted within the aerosol inlet 5 in the form of an ejector 11, which enables the momentum of the incoming vapor to accelerate the flow of the particle-bearing gas to be scrubbed into the downtake 28.

The diameter of the inner member or uptake 1 is greatest in its lower cylindrical section or mouth 12, which extends upward through the top 30 from a level in the downtake 28 below that of the lowest of the vapor inlets 8 to the convergent nozzle 13, where the diameter gradually narrows to a minimum at the throat 14 and widens again through the diffuser 24 to the upper cylindrical section 27, at the top of which is the scrubbed aerosol outlet 4.

Mounted tangentially to the wall 2 (above the junction thereof with the top 30) and directed there-through into the mouth 12 in the same direction as the aerosol inlet 5 and the vapor inlets 8 are a number of additional vapor inlets in the form of nozzles 38. These additional vapor inlets 38 are also fed from the vapor manifold 10 through the vapor inlet valves 9.

As in FIG. 1 a scrubbing liquid inlet in the form of a convergent nozzle or orifice 15, leading from a scrubbing liquid inlet valve 16, is mounted tangentially to the wall 2 and directed therethrough into the upper part of the mouth 12 in the same direction as the vapor inlets 38. Preferably, a reagent inlet 25 leads into the scrubbing liquid inlet 15 from the reagent inlet valve 26.

A mist collector 17, in the form of an electrostatic precipitator, is installed in the upper cylindrical section 27 of the conduit 1 below the scrubbed aerosol outlet 4.

In operation, the particle-bearing gas to be scrubbed is admitted continuously into the downtake 28 through the aerosol inlet 5, while the vapor of the scrubbing liquid continuously enters both the downtake 28 and the uptake 1 through the vapor inlets 8 and 38 at a rate controlled by the vapor inlet valves 9. The configuration of the ejector 11 in the aerosol inlet 5 enables the flow of vapor therethrough to draw the particle-bearing gas with it into the downtake 28.

Because of the tangential arrangement of the aerosol inlet 5 and the vapor inlets 8, the flow therethrough spins the contents of both the downtake 28 and the uptake 1 around their vertical axis. The particles heavy enough to be displaced centrifugally continue to be accelerated toward the conical base 3 of the cyclone or downtake 28 while the lighter particles remain in suspension as the central portion of the spinning aerosol reverses its downward motion to enter the mouth 12 of the uptake 1.

As the spinning aerosol rises through the uptake 1, its spinning motion is accelerated and its vapor content increased by the continuous flow of vapor through the tangentially directed vapor inlets 38 until particulate matter in its relatively colder inner zone is wet by condensed vapor. At the same time the warmer outer zone of the spinning aerosol is cooled, scrubbed and saturated with vapor by generally countercurrent contact with colder scrubbing liquid, continuously introduced into the upper part of the mouth 12 through the tangentially directed scrubbing liquid inlet 15 at a rate regulated by the scrubbing liquid inlet valve 16 (together with any reagents continuously fed into it through the reagent inlet 25 at a rate controlled by the reagent inlet valve 26), spinning in the same direction as it descends along the inside surface of the wall 2 against which wet particulate matter, made heavy enough to be displaced centrifugally by the spin of the vortex in the manner previously described, is impinged. The descending scrubbing liquid, together with the particulate matter wet or dissolved by it, remains in contact with the wall 2 until it reaches the bottom of the uptake 1, after which it flows centrifugally outward toward the wall 29 of the downtake 28 along which it helps to wash the heavier particles separated there toward the scrubbing liquid outlet 6 and the liquid discharge valve 7, through which they are continuously withdrawn.

Meanwhile residual mist droplets left in the scrubbed aerosol rising through the throat 14 are removed therefrom by the electrostatic precipitator 17 and allowed to drain downward along the inside of the wall 2 together with the rest of the scrubbing liquid while the scrubbed aerosol output is finally exhausted through the scrubbed aerosol outlet 4.

Figure 4:
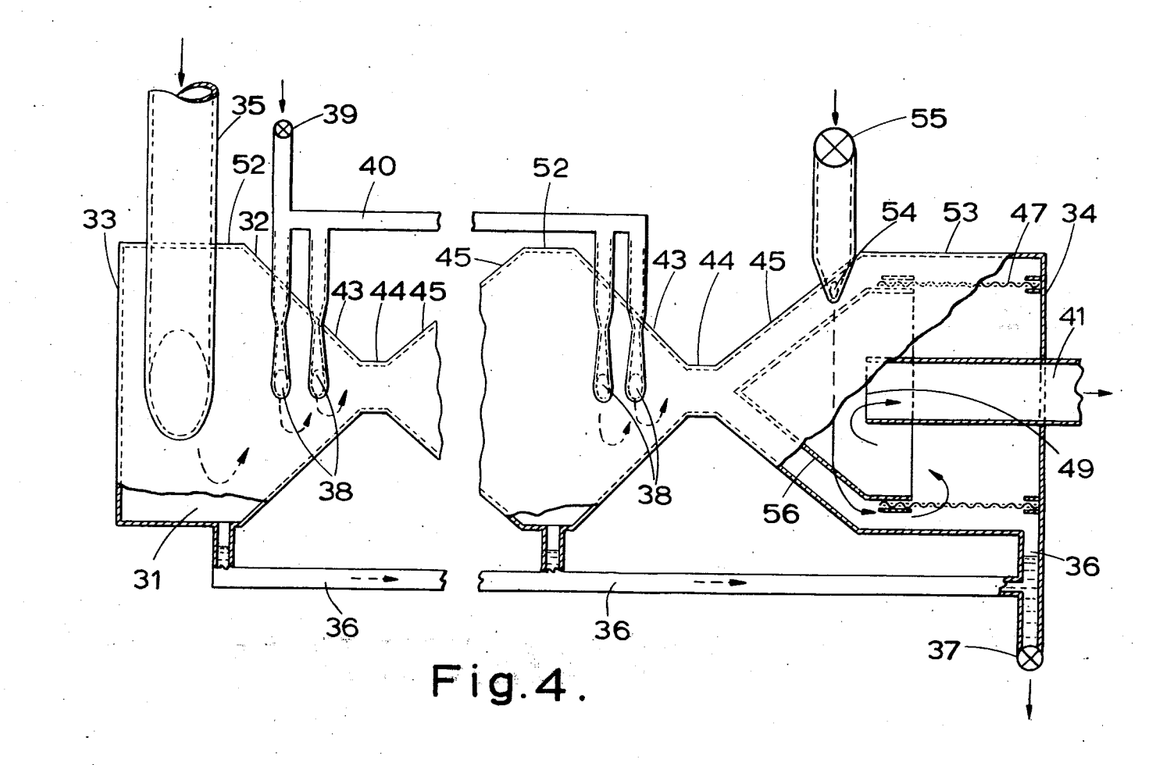

The embodiment shown in FIG. 4 comprises a generally horizontal conduit 31 enclosed by a wall 32, generally symmetrical about its horizontal axis, and circular ends 33 and 34.

The conduit 31 comprises a series of one or more venturi tubes created by a corresponding series of variations in the diameter of the wall 32. The wall 32 therefore comprises one or more cylindrical sections 52 of relatively wide diameter, each of which is followed in turn by a convergent conical section 43, a cylindrical throat section 44 of relatively narrow diameter and a divergent conical section 45 leading into the next wide cylindrical section 52 to continue the series until the final wide cylindrical section 53 is cut off by the end 34.

Near the end 33, a gaseous feed inlet 35 is mounted tangentially to the first of the wide cylindrical sections 52 of the wall 32 through which it leads into the conduit 31.

A scrubbing liquid outlet 36 leads through the bottom of each of the wide cylindrical sections 52 and 53 from the conduit 31 through the scrubbing liquid discharge valve 37.

Mounted tangentially on each of the convergent sections 43 and directed therethrough into the conduit 31 in the same direction as the gaseous feed inlet 35, are one or more scrubbing fluid inlets in the form of the nozzles 38, which are fed from the scrubbing fluid inlet valve 39 via the scrubbing fluid manifold 40.

Mounted tangentially on the last of the divergent conical sections 45 and directed therethrough into the conduit 31 in the same direction as the gaseous feed inlet 35 and the scrubbing fluid nozzles 38, is at least one inlet in the form of a nozzle 54, fed from the coolant inlet valve 55.

Coaxial with the wide cylindrical section 53 and extending from the conduit 31 through the center of the circular end 34 is the scrubbed gas outlet 41. Its mouth 49 is preferably shielded by the generally conical baffle 56 and the mist collector 47.

The operation of the embodiment is generally the same as that illustrated in FIGS. 1 to 3 and previously described. The particle-bearing gaseous feed to be scrubbed is introduced into the conduit 31 through the gaseous feed inlet 35 and spun around the horizontal axis thereof both by the tangential direction of the gaseous feed inlet 35 and the scrubbing fluid jets introduced thereinto in the same direction through the nozzles 38 at a rate regulated by the scrubbing fluid inlet valve 39. The scrubbing fluid can be introduced either in the liquid or vapor phase through a single manifold 40 or the two phases can be introduced separately through separate manifolds as illustrated in the other embodiments.

The particles wet by the condensation of the scrubbing liquid as the supersaturated gaseous phase is adiabatically cooled by its helical flow through each of the convergent sections 43 are centrifugally separated from the gaseous phase by its spinning motion and drain through the scrubbing liquid outlet 36 at a rate regulated by the scrubbing liquid discharge valve 37.

Before the scrubbed gaseous phase is finally discharged through the scrubbed gas outlet 41 (preferably via the mist collector 47), additional scrubbing according to the invention can be accomplished by the tangential introduction of a gaseous coolant (preferably part of the scrubbed gaseous phase previously discharged from the scrubbed gas outlet 41 and compressed and cooled before being thus recycled) through the coolant nozzle 54 at a rate regulated by the coolant inlet valve 55.

Such tangential introduction of a gaseous coolant into the last of the divergent conical sections 45 should spin and cool the contents thereof enough to maintain a state of supersaturation therein. This would not only inhibit the re-evaporation of previously condensed scrubbing liquid from the surfaces of the smaller particles but would also cause previously unwet particles to be precipitated by the nucleation of additional condensation in the course of producing the desired final temperature and vapor content in the scrubbed gas output.

I claim:

1. A process for separating particles suspended in a gas stream from the gaseous phase, at least some of the particles being too small to be centrifugally separated, the process comprising introducing a suspended particle-containing gas into an elongate vessel of generally circular internal cross-section, at a location adjacent the lower end of the vessel; introducing a scrubbing liquid at a location adjacent the upper end of said vessel; introducing scrubbing liquid vapor into the vessel whereby the gas and liquid move axially counter-currently through the vessel; spinning the gas and vapor within the vessel at a rotational velocity sufficient to create a vortex having a radial temperature gradient therethrough, the temperature decreasing radially inwardly of the vortex, as the gas adiabatically expands due to the tangential velocity; maintaining the temperature of the gas adjacent the outer periphery of the vortex sufficiently high to cause at least part of the scrubbing liquid to evaporate in an outer zone of the vortex, the radial temperature gradient being sufficient to cool the gas and vapor to the dew point of the vapor at a radius intermediate the outer periphery and longitudinal axis of the vortex, such that at least part of the resultant vapor is caused to condense upon some of the suspended particles at such relatively colder intermediate radius of the vortex, thus forming larger wetter particles; the larger wetted particles passing radially outwardly towards the warmer outer periphery of the vortex, where further condensation does not occur; and separately removing such larger wetted particles as the outer periphery of the vortex from the gaseous phase; wherein the suspended particles located between the aforesaid intermediate radius and the longitudinal axis of the vortex continue to be wetted by additional condensing vapor within the vortex until they are sufficiently heavy to be centrifugally separated from the gas stream by being spun outwardly towards the peripheral warmer portion of the gas vortex, from which they are removed.

2. The process of claim 1, including the step of passing the gaseous phase through a fine filament mesh thereby to coalesce some of the wetted particulate components thereof into drops of weight sufficient to fall from suspension.

3. The process of claim 1, including the step of introducing the vapor tangentially of the gaseous phase thereby to impart a spinning motion to said gaseous phase.

4. A process as claimed in claim 1, wherein the vapor is introduced into the gaseous phase at a plurality of successive points along the length of the vortex.

5. The process of claim 1 in which said liquid is introduced into said outer zone at a temperature below that of the gaseous phase therein.

6. The process of claim 1 in which said liquid contains a reagent capable of affecting at least one constituent carried by said gaseous phase.

7. The process of claim 1 in which the spinning motion of the gas suspension is generated by introducing the gas suspension into a longitudinal conduit through a tangentially-directed inlet.

8. The process of claim 7 wherein at least a portion of the conduit is of convergent diameter, axially, whereby the gaseous phase is caused to accelerate in velocity as it moves longitudinally along the axis of spin of the vortex and there is a resultant temperature gradient decreasing therealong.

9. Apparatus for the separation of particulate matter from a gaseous phase by causing condensation of a liquid upon the particles within a vortex so as to render them susceptible to separation by centrifugal force, the apparatus comprising a vertically arranged, elongated conduit, having an internal surface defining an interior space of generally circular cross-section; gas inlet means adjacent the lower end of said conduit, liquid inlet means adjacent the upper end of said conduit, and vapor inlet means into said conduit, for separately introducing a gas-particulate suspension, a scrubbing liquid, and a scrubbing liquid vapor, respectively, into the interior space, the three inlet means being located at the internal surface of the conduit and the openings being in a direction along a tangent to said internal surface; whereby there is generated a spinning motion to the gas about the longitudinal axis of the conduit so as to create a vortex with a temperature gradient steep enough to cause evaporation of the liquid in an outer zone thereof and recondensation of resultant vapor in an inner zone so as to form wetted particles; means to remove liquid and wetted particles from the lower end of the conduit; and means to remove scrubbed gaseous material from the upper end of the conduit.

10. The apparatus of claim 9 wherein at least part of said conduit is convergent.

11. The apparatus of claim 10 wherein the means for removing gaseous material from the smallest portion of a convergent conduit includes a divergent conduit immediately downstream of said smallest portion, whereby the convergent conduit and the divergent conduit together form what is substantially a venturi.

12. The apparatus of claim 9 wherein the means to remove condensed liquid from the conduit includes a mesh of fine filaments located in the path of the scrubbed gaseous material.

13. The apparatus of claim 12 wherein at least part of the fine filaments are electrically conductive and electrically connected to the ground.

* * * * *